(12) United States Patent
Coelho et al.

(10) Patent No.: US 7,979,316 B2
(45) Date of Patent: Jul. 12, 2011

(54) SYSTEM AND METHOD FOR FACILITATING MOBILE COMMERCE

(75) Inventors: Sohail Coelho, New York, NY (US); Luke Gebb, New York, NY (US); James Hedleston, New York, NY (US); Paul Sacchetti, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 1110 days.

(21) Appl. No.: 11/741,077

(22) Filed: Apr. 27, 2007

(65) Prior Publication Data

US 2008/0270251 A1 Oct. 30, 2008

(51) Int. Cl.
*G06Q 30/00* (2006.01)
(52) U.S. Cl. .................. 705/26.1; 705/27.1; 705/39
(58) Field of Classification Search .............. 705/26, 705/27, 39
See application file for complete search history.

(56) References Cited

U.S. PATENT DOCUMENTS

| | | | |
|---|---|---|---|
| 5,128,752 A | 7/1992 | Von Kohorn | |
| 5,909,023 A | 6/1999 | Ono et al. | |
| 6,173,267 B1 | 1/2001 | Cairns | |
| 6,185,541 B1 | 2/2001 | Scroggie et al. | |
| 6,195,644 B1 | 2/2001 | Bowie | |
| 6,601,040 B1 * | 7/2003 | Kolls | 705/14.23 |
| 6,735,572 B2 | 5/2004 | Landesmann | |
| 6,837,425 B2 | 1/2005 | Gauthier et al. | |
| 6,839,556 B2 | 1/2005 | Malackowski et al. | |
| 6,885,994 B1 | 4/2005 | Scroggie et al. | |
| 6,990,585 B2 | 1/2006 | Maruyama et al. | |
| 7,010,500 B2 | 3/2006 | Aarnio | |
| 7,055,031 B2 | 5/2006 | Platt | |
| 7,058,594 B2 | 6/2006 | Stewart | |
| 7,068,995 B1 | 6/2006 | Geddes et al. | |
| 7,076,244 B2 | 7/2006 | Lazaridis et al. | |
| 7,152,780 B2 | 12/2006 | Gauthier et al. | |
| 7,209,903 B1 * | 4/2007 | Mamdani et al. | 705/75 |
| 7,299,206 B2 * | 11/2007 | Taylor et al. | 705/37 |
| 7,577,585 B2 * | 8/2009 | Horrocks et al. | 705/26.82 |
| 7,778,920 B2 * | 8/2010 | Zarin et al. | 705/38 |
| 2002/0107791 A1 * | 8/2002 | Nobrega et al. | 705/39 |
| 2002/0138418 A1 * | 9/2002 | Zarin et al. | 705/38 |
| 2004/0215526 A1 * | 10/2004 | Luo et al. | 705/26 |
| 2007/0083439 A1 * | 4/2007 | Petrovich | 705/26 |

OTHER PUBLICATIONS

Valentine, The secret world of selling cards on the web, ABA Banking Journal, Sep. 1999.*
International Search Report and Written Opinion dated Jul. 7, 2008 in PCT Application No. PCT/US08/60182.

* cited by examiner

*Primary Examiner* — Jason Dunham
(74) *Attorney, Agent, or Firm* — Snell & Wilmer L.L.P.

(57) ABSTRACT

A system and method for facilitating the purchase of goods and/or services between the holder of a wireless communications device and a commerce system is disclosed. The system enables consumers who wish to participate in promotional sales offers to register with a mobile commerce system. Consumers may further define the types of items that they are interested in purchasing. Prior to the start of a promotion, the system sends a text message alert to registered consumers, giving them an opportunity to opt-in via text message from a wireless communications device. When the promotion is activated, the opted-in consumers are alerted via text message and are given an opportunity to send a text message back to the system indicative of a desire to purchase the promotional item. If defined conditions are met, the consumer's financial account is debited in the amount of the purchase and the consumer is instructed as to how to acquire their purchase.

21 Claims, 4 Drawing Sheets

SYSTEM AND METHOD FOR FACILITATING MOBILE COMMERCE

FIELD OF THE INVENTION

The invention generally relates to a system to facilitate commerce with a consumer equipped with a wireless device, and more particularly, to a system and method for consumers to opt-in to participate in a scheduled promotion via text messaging from a wireless device. The system alerts consumers when a promotion begins, and participating consumers may use their cell phone, or like device, to send a text message indicative of a desire to purchase the promotional item.

BACKGROUND OF THE INVENTION

Technologies leading to miniaturization of complex electronic components combined with innovations in the areas of wireless communications and software have resulted in a highly mobile society. In this mobile society, the ways by which we work, socialize, and engage in commerce have shifted significantly and the lines that traditionally divided these activities have blurred. For example, devices such as the cellular phone, Blackberry™, Personal Digital Assistant (PDA), and laptop computer have closed geographical barriers to enable users to learn, work, socialize, shop, and play from virtually any location and at any time. Moreover, such devices are increasingly being integrated, enabling even greater utility and portability to conduct such activities.

Companies are seeking to profit from this mobility shift at an increasing rate. In its infancy, insightful companies utilized the Internet to provide consumers with the electronic equivalence to the brochure. Soon thereafter, the Internet was used to not only showcase a company's goods and/or services, but to provide ways for the consumer to conveniently purchase products and services without leaving the home or office. Accordingly, a consumer with a personal computer and access to an Internet connection could shop and purchase items online from merchants all over the world. As geographical constraints are lifted by advancing computing and wireless technologies, merchants are again faced with determining how to benefit from this rapid technological evolution.

The benefit of the integration of computing, telephone, and Internet technologies into single wireless or handheld devices has not been fully realized. For example, while it is now possible to access the World Wide Web by way of a cell phone, most users have found it difficult or undesirable to navigate and interact with web pages by way of the very small LCD screens and limited functional controls provided by the cell phone. As such, most consumers still rely significantly on standard personal computers while utilizing smaller devices as portable extensions to larger computing devices. Text messaging, for example, enables mobile users to stay connected to others in a manner that was previously only available through instant messaging tools at a personal computer (e.g., AOL Instant Messenger™, Google Talk™, ICQ™, Jabber™, and Yahoo! Messenger™).

In order to capitalize on the growing market of mobile consumers, there is a need to enable these consumers to conveniently participate in commerce transactions without requiring them to be at a personal computer. Moreover, there is a need to provide consumers with the benefit of participating in special sale promotions using only their text message equipped wireless device. Such a system would provide a benefit to consumers, promotion sponsors, and merchants in that it opens an additional medium for facilitating commerce outside cumbersome computing devices traditionally used to facilitate online purchases.

SUMMARY OF THE INVENTION

The invention includes a system and method for providing mobile commerce to consumers through a wireless communications device such as, for example, a cellular telephone. The system includes a web site enabling consumers to register to participate in mobile commerce. Registration includes entering personal information, payment information, and an access number for the consumer's wireless communications device. Further, the consumer may select from a variety of promotional items (e.g., products and/or services) that she is interested in purchasing. On approval, the system sends a text message to the consumer's wireless communications device confirming registration and alerting the consumer of upcoming purchasing opportunities. In response, the consumer may send a text message to the system to opt-in for eligibility to participate in the upcoming purchasing opportunities.

The system determines when to activate special promotions and sends a text message alert to all consumers that opted-in for a promotion and a specific promotional item. At the time that the promotional item is made available for purchase, qualified participants may communicate their desire to purchase the promotional item by sending a text message to the system. When the text message is received, it is validated to determine whether the text message was received from a wireless communications device belonging to a pre-registered participant. When there is available inventory of promotional items, the system sends a text message back to the consumer indicating the outcome of the promotion (e.g., "YOU GOT IT", "SORRY, SOLD OUT", "IT'S TOO EARLY", etc.). An account of a purchasing participant is debited in the amount of the promotional item purchase price (less the value of any loyalty points used), and the participant is sent a confirmation email including purchase details. When inventory is allocated to a qualified consumer, a promotions representative contacts the qualified consumer and confirms the intent to purchase. In one embodiment, confirmation includes the collection of full payment details (e.g., credit card, debit card, reward point account, etc.). Following confirmation, the purchase is consummated.

In one embodiment, the system enables participating consumers to compete within special promotions that include a limited quantity of items at special reduced prices. Accordingly, purchase opportunities are awarded to consumers on a first-come, first-serve basis. For example, the administrator of the system may choose to offer a purchasing opportunity comprising five $3,000 vacation packages at a greatly discounted price. Thus, each of the first five consumer participants to text "I WANT" to the system may be awarded the opportunity to purchase one of the vacation packages for $500.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. Moreover, any of the functions or steps may be outsourced to or performed by one or more third parties. Furthermore, any reference to singular includes plural embodiments, and any reference to more than one component may include a singular embodiment.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the invention includes a system and method for enabling consumers to engage in commerce transactions through the use of a wireless communications device. As used herein, "wireless device" or similar terms may include any device configured to facilitate the exchange of information over a wireless network. The invention also contemplates that the "wireless network" may include some wired portions. While in one embodiment, the wireless device comprises a cellular telephone operating over a cellular network, those skilled in the art will appreciate that the invention contemplates other types of wireless devices including, for example, a satellite telephone, a cordless telephone, laptop computer, personal digital assistant (PDA), Blackberry, Global Positioning System device (GPS), and any similar device presently known or known in the future.

Figure 1:
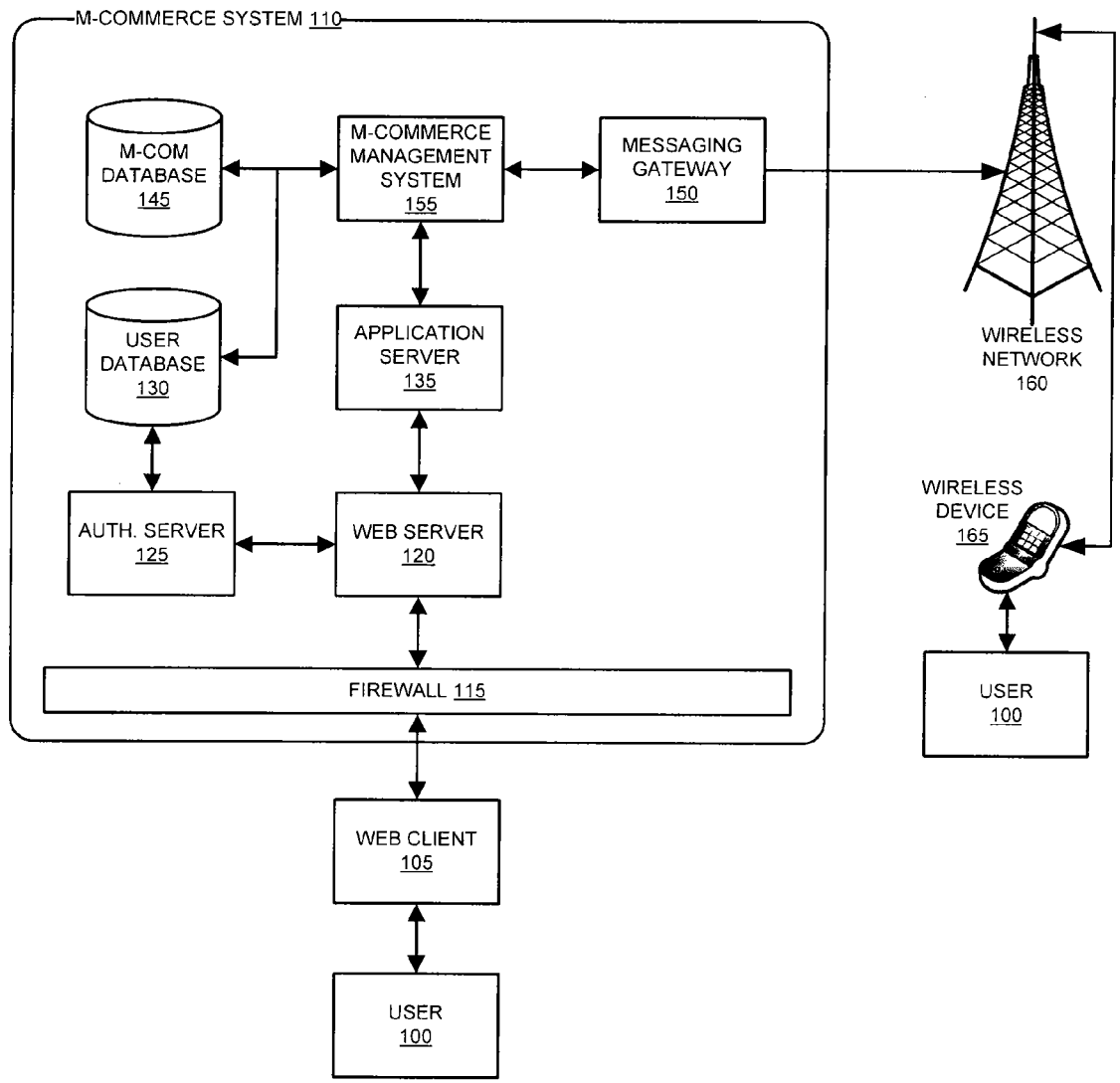
FIG. 1 is a block diagram illustrating the major system components for an exemplary system for proving mobile commerce to participants, according to exemplary embodiments of the present invention; and, FIG. 2A-2C is a process flow diagram showing exemplary steps for facilitating a sales promotion and enabling participation through a handheld wireless communication device, according to exemplary embodiments of the present invention.

With reference to FIG. 1, system 100 facilitates interaction between a user 100 and the M-Commerce System (MCS) 110 through, in one embodiment, a web client 105 with a network connection to a web server 120 and through a wireless device 165 with a wireless connection to a messaging gateway 150. Web server 120 may employ an authentication server 125 in order to validate and assign proper permissions to authorized users of MCS 110. User database 130 stores user credentials and permissions specific to each user. Web server 120 also employs an application server 135 to manage various applications and utilities that are utilized by the MCS 110. In one embodiment, the M-Commerce Management System (MCMS) 155 is invoked by application server 135 to query m-commerce (m-com) database 145, retrieve data, and perform complex calculations and data formatting for presentation to user 100 and/or any other designated third-party. M-com database 145 maintains data pertaining to promotions including product descriptions, prices, inventories, promotion schedules, promotion participants, promotion histories, and the like. In one embodiment, application server 135 may interface with a report engine (not shown) to create pre-configured and/or ad-hoc reports representing any data elements detailed herein.

In addition to the components described above, MCS 110 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user database 130, m-com database 145, as well as any number of other databases, both internal and external to MCS system 110 useful in the operation of the invention as disclosed.

As used herein, the term "network" shall include any electronic communications means which incorporates both hardware and software components of such. Communication among the parties may be accomplished through any suitable communication channels, such as, for example, a telephone network, an extranet, an intranet, Internet, point of interaction device (point of sale device, personal digital assistant (e.g., Palm Pilot®, Blackberry®), cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

In one embodiment, MCMS 155, or any other MCS 110 component, may interact with any number of additional computing systems and databases in order to facilitate, for example, billings, accounting, shipping, and the like. Computing systems and databases residing outside of MCS 110 may be administered by a mobile commerce provider or any other third party entity directly or indirectly involved in facilitating the disclosed system. Such third party entities may include cellular service providers, credit account issuers, merchants, automated clearing houses (ACH), shipping companies, and the like.

As will be appreciated by one of ordinary skill in the art, the invention may be embodied as a customization of an existing system, an add-on product, upgraded software, a standalone system (e.g., kiosk), a distributed system, a method, a data processing system, a device for data processing, and/or a computer program product. Accordingly, the invention may take the form of an entirely software embodiment, an entirely hardware embodiment, or an embodiment combining aspects of both software and hardware. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

User 100 may include any individual, business, entity, government organization, software and/or hardware which interact with MCS 110 to register with and participate in the disclosed mobile commerce activities. User 100 may be, for example, a consumer who accesses web site 140 to register for participation in future special promotions. Moreover, user 100 may access messaging gateway 150 to opt-in for particular promotions and/or express a desire to purchase a promotional item. In another example, user 100 may be an administrator who interacts with various MCS 110 components to manage one or more promotions through the addition, deletion, and/or modification of data stored in m-com database 145 and/or user database 130. In one embodiment, MCS 110 may provide limited or restricted access for certain people or groups, such as, for example, customers, employees, or any other third party with an interest in managing and participating in mobile commerce activities. User 100 may interface with MCS 110 via any communications protocol, device or method discussed herein or known in the art. In one embodiment, user 100 may interact with the invention via an Internet browser at a web client 105 and/or wireless device 165 via text messaging.

Web client 105 may comprise any hardware and/or software suitably configured to facilitate input, receipt and/or review of any information related to MCS 110 or any information discussed herein. Web client 105 may include any device (e.g., personal computer), which communicates (in any manner discussed herein) with the invention via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 105 may or may not be in direct contact with the MCS 110. For example, web client 105 may access the services of the MCS 110 through another server, which may have a direct or indirect connection to web server 120.

As those skilled in the art will appreciate, web client 105 may include an operating system (e.g., WINDOWS NT, 95/98/2000/Vista, OS2, UNIX, LINUX, SOLARIS, MAC OS, etc.) as well as various conventional support software and drivers typically associated with computers. The web client 105 may include any suitable personal computer, network computer, workstation, minicomputer, mainframe or the like. Web client 105 can be in a home or business environment with access to a network. In an exemplary embodiment, access is through a network or the Internet through a commercially available web-browser software package.

Web client 105 may be independently, separately or collectively suitably coupled to the network via data links which includes, for example, a connection to an Internet Service Provider (ISP) as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, service oriented architecture, biometrics, grid computing and/or mesh computing.

Web server 120 may include any hardware and/or software suitably configured to facilitate communications between web client 105 and one or more MCS 110 components. Further, web server 120 may be configured to transmit data to web client 105 within markup language documents. Web server 120 may operate as a single entity in a single geographic location or as separate computing components located together or in separate geographic locations. Requests originating from client browser 105 may pass through a firewall 115 before being received and processed at web server 120. As used herein, "transmit" may include sending electronic data from one system component to another over a network connection. Additionally, as used herein, "data" may include encompassing information such as commands, queries, files, data for storage, and the like in digital or any other form. Web server 120 may provide a suitable web site or other Internet-based graphical user interface which is accessible by users 100, administrators, promotion sponsors, or any other authorized third party. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, ORACLE, SYBASE, INFORMIX MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789.98). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

In one embodiment, firewall 115 comprises any hardware and/or software suitably configured to protect MCS 110 components from users of other networks. Firewall 115 may reside in varying configurations including Stateful Inspection, Proxy based and Packet Filtering among others. Firewall 115 may be integrated as software within web server 120, any other system component or may reside within another computing device or may take the form of a standalone hardware component.

In one embodiment, applications server 135 includes any hardware and/or software suitably configured to serve applications and data to a connected web client 105. Like web server 120, applications server 135 may communicate with any number of other servers, databases and/or components through any means discussed herein or known in the art. Further, applications server 135 may serve as a conduit between web client 105 and MCMS 155. Web server 120 may interface with applications server 135 through any means discussed herein or known in the art including a LAN/WAN, for example. Application server 135 may further interact with authentication server 125, messaging gateway 150, m-com database 145, user database 130, or any other MCS 110 component in response to a user 100 request.

To control access to web server 120 or any other component of the invention, web server 120 may invoke authentication server 125 in response to submission of user 100 authentication credentials received at web server 120. In one embodiment, authentication server 125 includes any hardware and/or software suitably configured to receive authentication credentials, encrypt and decrypt credentials, authenticate credentials, and grant access rights according to user 100 pre-defined privileges attached to the credentials. Authentication server 125 may grant varying degrees of application and data level access to user 100 based on user information stored within user database 130. In one embodiment, authentication server 125 may be accessed by MCMS 155 in order to validate signals received by messaging gateway 150 from cellular network 160.

As used herein, cellular network 160 may comprise any number of computing systems, relays, switches, radio towers, and satellites in order to provide wireless communications between any number of subscribing members. Those skilled in the art will appreciate that such systems are well known, and variations and advancements to the underlying technologies do not limit the scope of the invention. The invention contemplates that such networks may include, for example, land based RF transponders and satellites in low earth orbit to provide voice and data transmissions between a number of both stationary and portable devices.

In one embodiment, user database 130 includes any hardware and/or software suitably configured to facilitate storing authentication and/or privilege information relating to users 100. M-com database 145 stores data relating to product information, promotion participation, transactional histories, promotion schedules, as well as any other related information as disclosed herein. One skilled in the art will appreciate that the invention may employ any number of databases in any number of configurations. For example, a database may be employed to store functions and/or parameters that are used by MCMS 155 to determine user eligibility to participate in a promotion. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the invention by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to create, update, delete or augment the data in accordance with the header or trailer. As such, in one embodiment, the header or trailer is not stored on the transaction device along with the associated issuer-owned data but instead the appropriate action may be taken by providing to the transaction instrument user at the standalone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the invention may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, the software elements of the invention may be implemented with any programming or scripting language such as C, C++, JAVA, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The software elements of the present invention may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts, text messages, and the like. It should be further appreciated that the multiple steps as illustrated and described may be combined into single web pages and/or wireless device 165 interfaces but have been expanded for the sake of simplicity. In other cases, steps illustrated and described as single process steps may be separated into multiple web pages and/or wireless device 165 interfaces but have been combined for simplicity.

Referring now to the figures, the block system diagram and process flow diagram represent mere embodiments of the invention and are not intended to limit the scope of the invention as described herein. For example, the steps recited in FIGS. 2A-2C may be executed in any order and are not limited to the order presented. It will be appreciated that the following description makes appropriate references not only to the steps depicted in FIGS. 2A-2C, but also to the various system components as described above with reference to FIG. 1.

Figure 2A:
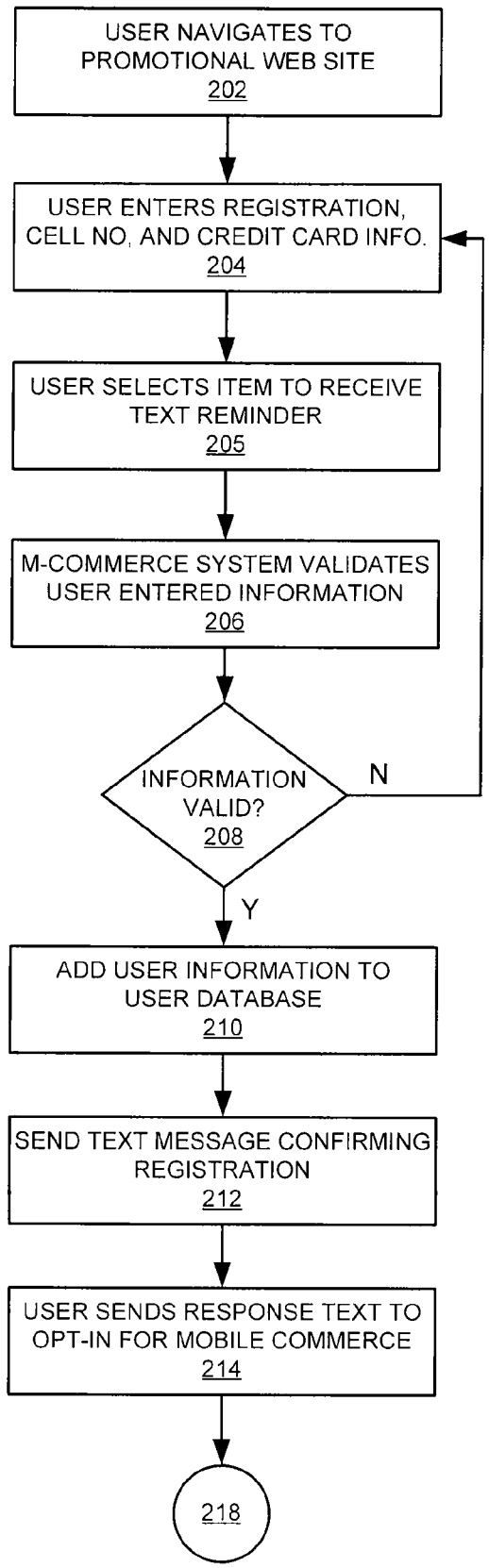
Figure 2B:
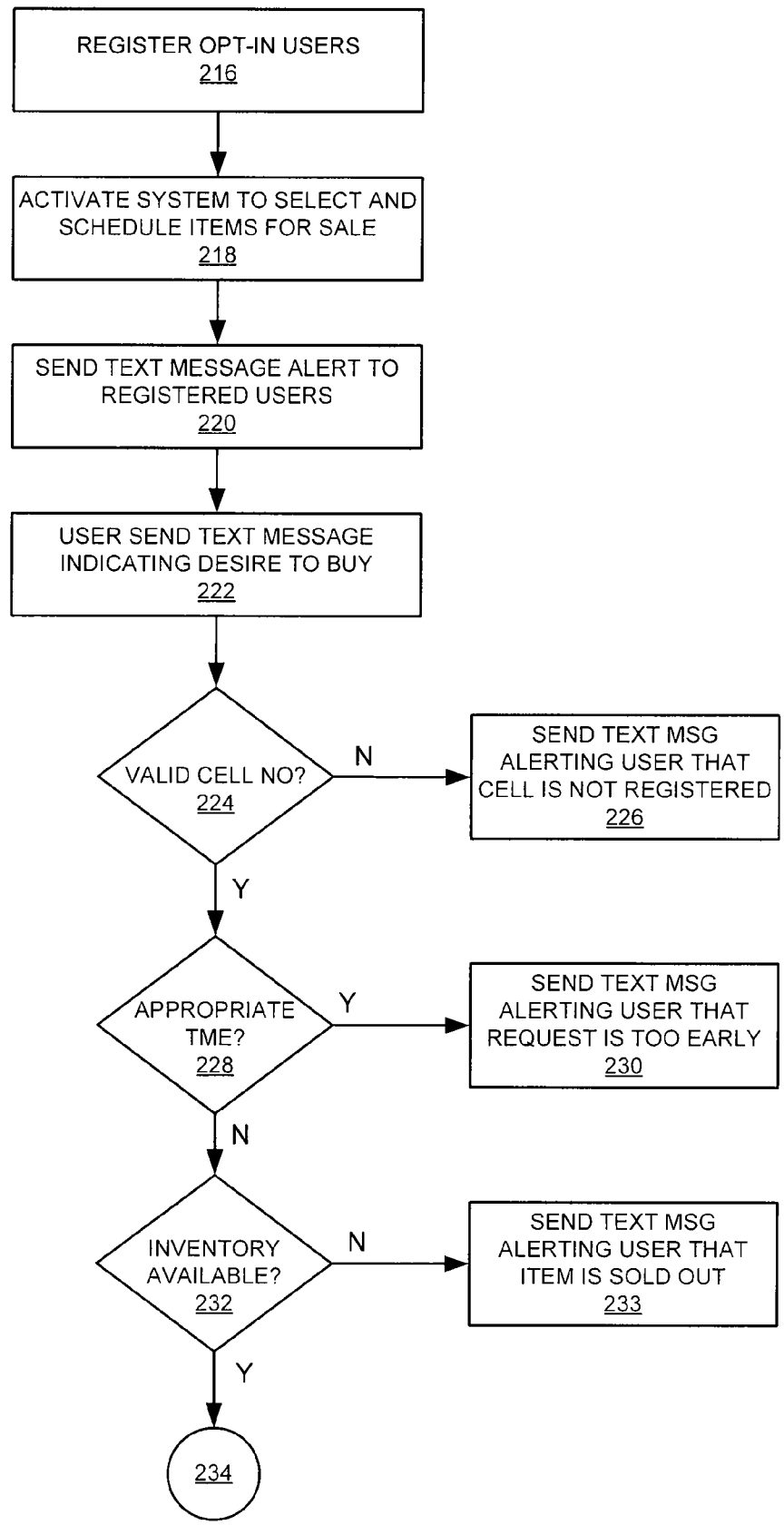
Figure 2C:
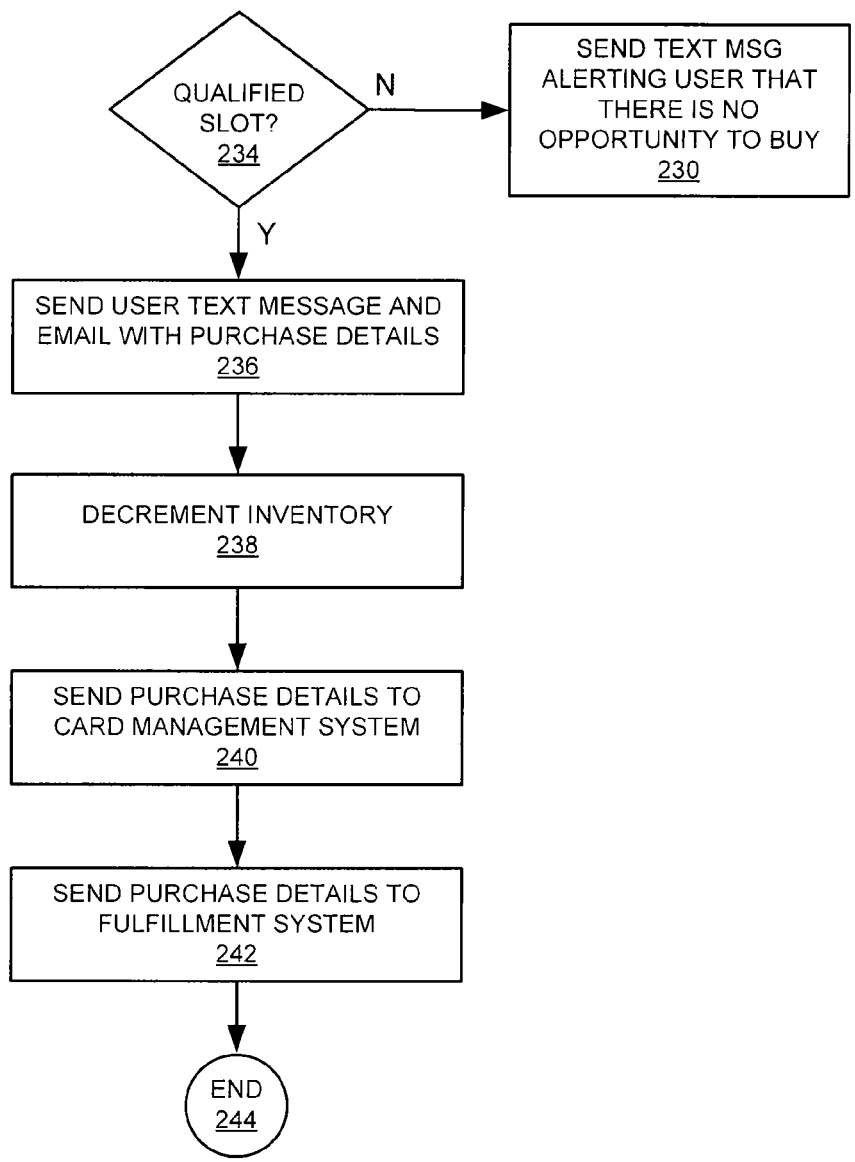

With reference to FIG. 2A, a user wishing to purchase one or more items according to the disclosed mobile commerce system, may initiate a registration process. The registration process provides MCS 110 with information required to identify the user, facilitate communications with the user, and ensure prompt and accurate payment for items "won" by the user. As used herein, various forms of the term "awarded", "qualified" or "won" are indicative of one or more users' successful bid to purchase an item offered as a promotion. In one embodiment, the promotion sponsor configures a promotion with a limited number of items at a significantly reduced price. Thus, many users may desire to purchase a promotional item; however, limited few will be selected to conduct the purchase transaction. Those skilled in the art will appreciate that while specific methodologies for selecting winners are disclosed herein, the invention contemplates additional factors that may contribute to the selection of winners. Such factors may include, for example, high bids, low bids, user status, history of the opportunity to purchase or being qualified to purchase an item, losing history, history with the sponsor or host, user seniority, number of loyalty points earned by the user, number of previous wins, user location, credit account status, credit account balance, and/or the like.

To initiate mobile commerce registration, user 100 may interact with web client 105 to access a website of a promotion sponsor (step 202). A promotion sponsor may be a credit, charge or other transaction account issuer, merchant, consortium of merchants, government entity, charitable organization, or any other party interested in offering special promotions to build loyalty, product/service awareness, increase profits, or the like. For example, American Express may offer special promotions at various intervals to its card members in order to entice prospective card members to apply for an American Express card.

To register for participation in mobile commerce, MCS 110 may request user 100 to enter information such as personal information, wireless device information, and information pertaining to a payment instrument (step 204). Personal information may include, for example, the user's first and last name, street address, city, state, postal code, shipping address, email address, photograph, biometric, etc. A wireless access number may comprise a cellular telephone number or any other number or code used to establish voice and/or data communication with the user's wireless device 165. Payment instrument information may include, for example, a credit card type, credit card number, expiration date, security code, and the like. Requested registration information may be entered into a web form, that when completed, is transmitted to MCS 110 for validation (step 206).

Validation includes, for example, verifying that all required form fields have been entered, determining whether the user is eligible to participate in mobile commerce, and determining whether an account of the payment instrument is valid and is in good standing. In one embodiment, promotions may have a very limited number of items for sale that may sell-out very quickly. Those skilled in the art will appreciate that many consumers are often willing to express an interest to purchase an item, yet for a variety of reasons, do not follow through with the purchase transaction. For example, a consumer may call a merchant to inquire about a particular product. The merchant may confirm that the product is in inventory, but is expected to be a sell-out. Some merchants will agree to hold the product for the inquiring consumer, only to find that the customer does not follow through with the purchase. As a result, the merchant may be left with unsold inventory.

To ensure that the user follows through with an awarded purchase, MCS 10 is configured to process payment for an item at the time the purchase is awarded. Therefore, user 100 is pre-approved to participate in mobile commerce transactions based, at least in part, on the payment instrument information entered at step 204. Moreover, this minimizes the interaction between user 100 and MCS 110. For example, user 100 is not required to establish a secured connection with MCS 110 following being awarded a purchase in order to enter credit card information.

If, for any reason, the registration information is found invalid (step 208), MCS 110 may direct user 100 back to the registration form to correct errors or select an alternative payment instrument. In the case that MCS 110 determines that user 100 is not qualified to participate in mobile commerce, the system may alert the user in real time within the registration form interface, via email, text message, or by any other means known in the art. In one embodiment, the alert may provide a reason for denial along with information pertaining to how the user 100 may become qualified. This may be useful if, for example, the promotion sponsor is a credit card issuer and user 100 does not posses an account with the issuer. Under this scenario, the alert may provide user 100 with a link to apply for a credit card account with the sponsoring issuer in order to become eligible to participate in mobile commerce transactions.

If registration information for user 100 is validated (step 208), MCS 110 stores the information (step 210) within appropriate tables of user database 130 and m-com database 145. For example, the user may have been prompted to select a user ID and password to access MCS 110 system. The selected user ID and password may be encrypted and stored in the user database 130 for subsequent authorized access. In one embodiment, MCS 110 stores transaction instrument information and the wireless device information in m-com database 145. However, those of ordinary skill would appreciate that that registration information may be stored in any number of configurations and within any number of databases and database tables.

In one embodiment (not shown), user 100 may connect to MCS 110 through web client 105 to set preferences. Preferences may include, for example a class of items that user 100 would be interested in purchasing (i.e., a wish list), a price range that user 100 would be willing to buy specified items at, a time frame for a desired purchase, and the like. User 100 preferences may be stored along with user information in user database 130 or in m-com database and later used by MCS 110 for analysis. Such analysis may provide, for example, insight into the types of items most frequently requested, a price threshold for specific products, and when to offer such products within promotions. Moreover, a subset of registered users for which to extend an invitation to participate in a promotion may be selected based on the preferences.

At a scheduled time, MCS 110 generates a text message announcing details regarding an upcoming offer for sale and transmits the message to the wireless device 165 of each registered user (step 212). An "offer for sale," or similar terminology used herein, may include a future offer, a previously scheduled offer, an offer generated at random time intervals, a rental offer, a lease offer, an offer to share information, an offer to barter, offer to earn or redeem loyalty points, and/or any other item which may be offered. A "purchase transaction", or similar terminology used herein, may include a sale, rental, lease, loyalty point redemption, a way to earn loyalty points, and/or any agreement to enter into any other type of transaction. Registered users wishing to participate for an opportunity to purchase a promotional item may send an opt-in text message (step 214) from their wireless device 165 to MCS 110. According to one embodiment, the text message comprises a code or a set of words that are indicative of the user's desire to purchase the item. For example, after receiving the promotion announcement at the wireless device 165, the user may simply send a blank response to the text message announcement, which is sent to a specified telephone number. On receiving the text message, messaging gateway 150 passes the message to MCMS 155 for processing, where MCMS 155 registers the user (step 216) within m-com database 145.

In one embodiment, MCMS 155 registers the user by retrieving user data from user database 130 corresponding to the identity of the user's wireless device 165. MCMS 155 then creates a record in m-com database 145 and populates the record from the user data. In another embodiment, MCMS 155 invokes a form-fill utility, which uses data from user database 130 to automatically fill an online web form on web server 120. For example, web server 120 may currently provide a web form to PC-based Internet users to complete in order to opt-in for a promotion. This existing form (or a similar form) may be automatically populated on behalf of a user as a result of a user opting-in to a promotion by way of a simple text message from a wireless device 165. For more information on automatic form-filling, see U.S. Pat. No. 6,490,601, filed on Jan. 15, 1999, and entitled "Server for Enabling the Automatic Insertion of Data into Electronic Forms on a User Computer," which is hereby incorporated by reference.

MCS 110 is activated and promotional items are selected and scheduled for sale (step 218). When it is time for a scheduled promotion to begin, MCS 110, by way of messaging gateway 150 generates and sends a text message to all users who had previously opted-in for the specific promotion informing users that the item is now available for sale (step 220). In one embodiment, the message serves only as a reminder when an opted-in user is made aware of the precise timing of the promotion during step 214. However, in another embodiment, the user is given no prior notice as to when the promotion will occur, thus the text message serves as an announcement.

If user 100 who is opted-in for the specific promotion wishes to purchase the promotional item, then user 100 generates and sends a text message to MCS 110 that is indicative of a desire to purchase the item (step 222). As used herein, a text message that is indicative of a desire to purchase an item may be a binding or non-binding acceptance, reservation, agreement, wish, desire, or any other interest in purchasing the promotional item. The text message may be of any predefined format, or simply comprise the user ID selected during initial registration. In one embodiment, user 100 enters the short phrase, "I WANT" and sends the text message to MCS 110. In another embodiment, user 100 may enter the short phrase, "RESERVE" and sends the text message to MCS 110 in order to indicate that user 100 would like to reserve an item in inventory for later purchase.

When the text message indicative of the user's desire to purchase the promotional item is received at MCS 110, MCMS 155 validates the access number (step 224) of the wireless device 165 against numbers stored in either m-com database 145 or user database 130. Those skilled in the art will appreciate that any means known in the art for determining a wireless device access number may be employed in order to ensure that the text message is received from a registered user. For example, a simple caller ID device may be used to determine the number for the originator of a text message. Moreover, MCS 110 verifies that the text message was received from a qualifying wireless device 165. If the text message originated from a registered user, yet the user did not opt-in for the specific promotion, then the user is disqualified and MCS 110 sends user's wireless device 165 a text message informing the user that the wireless device is not registered (step 226). Because many people now carry more than one wireless device 165, such a message may result from the user's inadvertent attempt to indicate a desire to purchase the item over the wrong wireless device 165. For example, user 100 may register for mobile commerce using both the phone number for the user's business cell phone and personal cell phone. Later, the user may use a business cell phone to opt-in for a particular promotion. However, when sending a text message indicating a desire to purchase a promotional item, the user may use a personal cell phone, thereby prompting the system to determine that the user is not eligible for the promotion. However, this problem may be alleviated by only sending promotion announcements to those registered users that opted in. In another embodiment, the system may recognize the second cell phone number as belonging to the same owner of the first cell phone number, according to information that is provided during initial registration.

If an incoming text message indicative of a desire to purchase a specific promotional item is validated (step 224), then MCS 110 determines whether the message was received prior to the start of the promotion (step 228). If the incoming text message indicative of a desire to purchase a specific promotional item is not received at the appropriate time (e.g., too early), then MCS 110 sends user 100 a text message indicating that the user's request is too early (step 230). In one embodiment, the system may query historical transaction records in m-com database 145 to determine if the owner of the originating wireless device access number has been previously awarded the opportunity to purchase the specific item in the current promotion. This may be useful in preventing a single registered user from being allotted more than one of the promotional items in order to maintain fairness among all users who opted-in. In another embodiment, the user is disqualified from being awarded an opportunity to purchase the same item, albeit a different promotion.

To determine whether there is a remaining inventory of the promotional item, MCS 110 queries m-com database 145, which reduces the inventory each time a winner is determined. If inventory is not available (step 232), then MCS 110 sends user 100 a text message indicating that the promotional item is sold out (step 233). As previously noted, the present invention may award promotional items based on the first text messages received from users until the inventory is depleted. However, those skilled in the art will appreciate that any number of secondary considerations may influence which users are awarded the purchase of a promotional item. For example, those who have participated in a greater number of promotions may be given priority. In one embodiment, a combination of factors may determine who is awarded a purchase of a promotional item. For example, the invention contemplates a weighting scheme whereby varying factors are attributed varying weights. Thus, when a text message indicative of a desire to purchase a promotional item is received, MCS 110 calculates an overall score based on a defined set of factors to determine an overall score. Based on the score, the user may be awarded the purchase of the promotional item, or declined.

In one embodiment, a promotion may not be so limiting. In situations were a very large inventory of promotional items is available, the MCS 110 may continue to allow any registered user to purchase the item until either demand is fulfilled or the inventory is depleted. In another embodiment, MCS 110 may make available promotional items over a predetermined amount of time, wherein any registered user may secure the item through a purchase initiated through a text message indicative of a desire to purchase. For example, a promotion sponsor may choose to make available its entire inventory of toys over a period spanning from November 30 to December 24. MCS 110 generates and sends a text message announcing the promotion, whereby any registered user may respond by sending an "I WANT" text message back to MCS 110 to secure the purchase.

If all, or any subset of, the above conditions are not met (steps 224, 228, 232), then the user is not afforded a qualified slot (step 234) and MCS 110 generates and transmits a text message to wireless device 165 alerting user 100 that he will not be awarded the opportunity to purchase the promotional item (step 230). In one embodiment, the message may be accompanied by a secondary offer. For example, if user 100 was not awarded the opportunity to purchase a Sony laptop computer, then MCS 110 may advise user of an upcoming promotion for the purchase of a Dell laptop computer.

When all, or any subset of, the above conditions are satisfactorily met (steps 224, 228, 232), MCS 110 assigns the user to a qualifying slot (step 234) and MCS 110 generates and sends a text message to the qualified user(s), which includes purchase details (step 236). In one embodiment, MCS 110 also sends a similar message to the user's email account that was provided during initial registration. Such purchase details may include, for example, a description of the purchased item, purchase price, and acquisition instructions. For example, MCS 110 may generate the following text message for transmission to the wireless device 165 of a qualified user:

---

YOU GOT IT!
ITEM: SONY 36' FLAT SCREEN TV
PRICE: $60.00
PLEASE CALL (444)444-4444 TO CLAIM

---

In one embodiment, the text message may further, or alternatively, instruct user 100 to check their email account or select a link for detailed instruction regarding their opportunity to purchase the promotional item. In another embodiment, the user 100 may be instructed that they will receive a call from a customer service representative to discuss details of the opportunity to purchase and provide further instructions regarding acquisition of the purchased item.

When a promotional item is awarded for purchase, MCS 110 sends purchase details over a payment network to a card management system (step 240) for processing. Thus, when a determination of an opportunity to purchase is made, MCS 110 may route the transaction through a merchant Point of Sale (POS) device as is standard in the art. Further, MCS 110 may send purchase details to a fulfillment system in order to ship the item to the user (step 242). In another embodiment, the user 100 may be instructed as to where he may physically take possession of the item. Those skilled in the art will appreciate that MCS 110 may invoke and/or facilitate any number of additional steps as required according to the particular configuration. For example, MCS 110 may be administered through a third party entity to provide the functionality described above for any number of merchants. Thus, MCS 110 may further provide purchase details to the merchant offering the promotional item for sale. Under this embodiment, MCS 110 may route purchase transaction details to the merchant for processing through the merchant's POS system.

The invention contemplates other embodiments including the redemption of loyalty points for promotional items. Moreover, loyalty points may be issued to user's upon being awarded the opportunity to purchase a promotional item. Those of ordinary skill in the art will appreciate that the invention may be combined with any number of known commerce or loyalty systems to augment and/or expand the utility of the present invention. For example, the invention may be combined with an online auction system or any other commerce system to expand on the capabilities disclosed herein.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:
1. A computer-implemented method comprising:
  receiving pre-approval data, by a computer based system for facilitating a purchase of an item using a wireless device, wherein said pre-approval data qualifies a user to be able to agree to purchase an item without the transmission of payment information in response to a purchase;
  issuing, by said computer based system, pre-approval status to said user in response to receiving an account number on a transaction card;

transmitting, by said computer based system, a notification of an offer for sale of an item;
receiving, by said computer based system, an agreement to purchase said item and to initiate a purchase transaction;
transmitting, by said computer based system, a confirmation in response to acceptance of said agreement;
processing, by said computer based system, a payment for said item using a medium related to said transaction card for said item, in response to acceptance of said agreement; and
wherein said step of receiving an agreement to purchase said item comprises receiving an indication to initiate a purchase transaction using a portion of loyalty points, wherein said medium related to said transaction card is loyalty points.

2. The method of claim 1, wherein said wireless device is at least one of: a telephone, a personal digital assistant, and an email device.

3. The method of claim 1, wherein said step of receiving an agreement to purchase comprises receiving an indication to reserve said item for purchase at a later time.

4. The method of claim 1, further comprising receiving, from said user, an indication of interest to receive additional notifications in response to said item being offered for sale.

5. The method of claim 1, wherein said step of receiving an agreement comprises receiving an agreement via at least one of: an email, text message and verbal request.

6. The method of claim 1, wherein said step of receiving an agreement comprises a word, a transaction card number, a personal identification number (PIN) and a code.

7. The method of claim 1, wherein said step of transmitting a notification of said offer for sale occurs at pre-defined times.

8. The method of claim 1, wherein said step of receiving an agreement to purchase comprises receiving a bid to purchase said item.

9. The method of claim 1, wherein said step of transmitting a notification comprises transmitting at least one of: an item descriptor, item price, date available for purchase, and time available for purchase.

10. The method of claim 1, wherein said step of transmitting a confirmation comprises sending a confirmation via at least one of: text message, email message, telephone call, facsimile, and pager message.

11. The method of claim 1, wherein said step of transmitting a notification of an offer for sale of an item is based on receiving a selection of said item from a web site.

12. The method of claim 1, wherein said step of transmitting a notification of an offer for sale of an item is based on at least one of: a desired price, desired quantity, desired purchase date, desired purchase time, and an item availability alert mode.

13. The method of claim 1, further comprising issuing loyalty points based on at least one of said step of transmitting a confirmation and a successful purchase.

14. The method of claim 1, further comprising initiating a purchase transaction.

15. The method of claim 1, further comprising initiating a purchase transaction by automatically populating web form.

16. A commerce management utility comprising:
a non-transitory memory in communication with a processor for facilitating a purchase of an item using a wireless device;
the processor, in response to executing a computer program, is configured to:
receive, by said processor, pre-approval data and to issue pre-approval status to a user in response to receiving an account number on a transaction card, wherein said pre-approval data qualifies said user to be able to agree to purchase an item without transmission of payment information in response to a purchase;
transmit, by said processor, a notification of offers for sale of an item;
receive, by said processor, from said user an agreement to purchase said item and to initiate a purchase transaction;
transmit, by said processor, via a messaging gateway, a confirmation in response to said agreement being accepted;
process a payment for said item using a medium related to said transaction card for said item in response to acceptance of said agreement; and
receive an indication to initiate a purchase transaction using a portion of loyalty points, wherein said medium related to said transaction card is loyalty points.

17. The commerce management utility of claim 16, wherein said commerce management utility is further configured to receive an indication of interest to receive additional notifications in response to said item being offered for sale.

18. The commerce management utility of claim 16, further comprising a user database configured to store said pre-approval data.

19. The commerce management utility of claim 16, further comprising a wireless network configured to receive said agreement to purchase and to transmit said notification.

20. A non-transitory computer readable storage medium containing a set of instructions that in response to being executed by a computing device for facilitating a purchase of an item cause the computing device to perform operations comprising:
submitting, by a computer based system, pre-approval date including an account number on a transaction card to a host, wherein said pre-approval date qualifies a user to be able to agree to purchase an item without the transmission of payment information in response to a purchase of said item using a wireless device;
obtaining, by a computer based system, pre-approval status,
receiving, by a computer bases system, from a host, a notification of offers for sale of an item,
transmitting, by a computer based system, to said host, an indication of interest to receive additional notifications in response to said item being offered for sale;
transmitting, by a computer based system, to said host, an agreement to purchase said item and to initiate a purchase transaction;
receiving a confirmation in response to said agreement being accepted;
processing a payment for said item using a medium related to said transaction card for said item, in response to acceptance of said agreement; and
wherein said step of receiving an agreement to purchase said item comprises receiving an indication to initiate a purchase transaction using a portion of loyalty points, wherein said medium related to said transaction card is loyalty points.

21. The computer readable storage medium of claim 20, wherein said computer readable storage medium is located in a wireless device.

* * * * *